Nov. 1, 1949.  R. M. ROOKE  2,486,575
DRAG ATTACHMENT FOR HAND CUTTING-TORCHES
Filed March 7, 1945
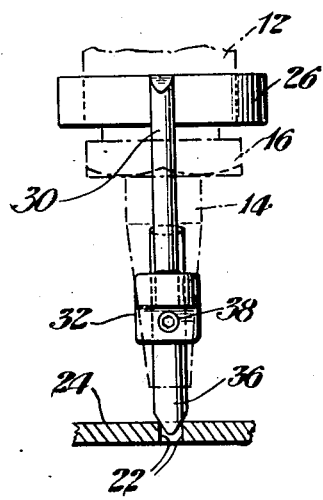
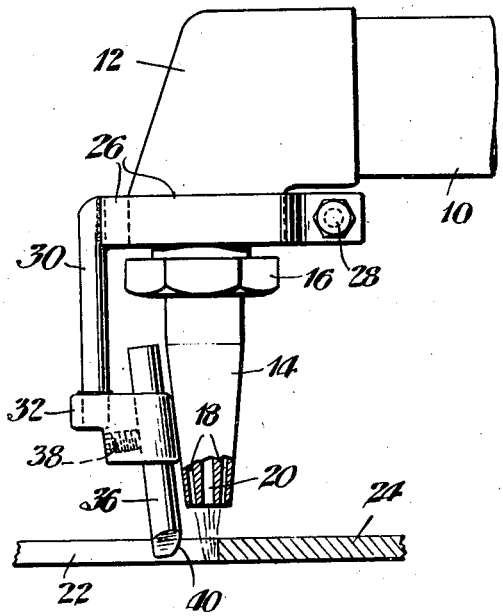
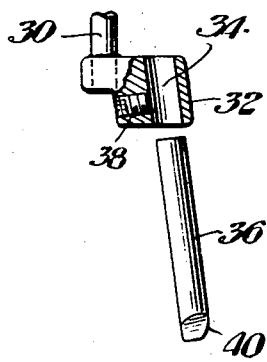
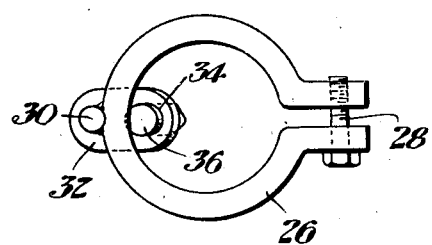
INVENTOR
*ROBERT M. ROOKE*
BY
ATTORNEYS Patented Nov. 1, 1949

2,486,575

UNITED STATES PATENT OFFICE 2,486,575

DRAG ATTACHMENT FOR HAND CUTTING TORCHES

Robert M. Rooke, Long Branch, N. J., assignor to Air Reduction Company, Incorporated, a corporation of New York Application March 7, 1945, Serial No. 581,376

3 Claims. (Cl. 266—23)

This invention relates to improvements in hand cutting-torches, and more particularly to a drag attachment for hand cutting-torches.

In cutting metal with a hand-guided, kerf-cutting torch, the torch if held at a predetermined distance from the work-piece and moved in a straight line will cut a kerf of substantially uniform predetermined width. The handling of the torch in such a cutting operation is facilitated if some means is used to guide and steady the torch tip and to maintain the tip the proper distance from the work being cut. If such means produces a drag on the torch and thereby somewhat retards the movement of the torch, the cutting operation can be performed still better since the drag exerted on the torch gives the operator a better feel on the torch and assists him in moving it at the proper uniform cutting speed. Roller attachments are sometimes used on hand cutting-torches to steady and guide the torch and maintain its tip the proper distance from the work, but such attachments have no effect in producing the above mentioned beneficial drag. Sometimes the torch tip itself is given a special shape so that when its end is allowed to ride in the upper portion of the kerf it will tend to steady and guide the torch and maintain the gas orifices the proper distance from the work and will also produce a drag on the torch. However, the material best suited for tip manufacture wears away easily when the end of the tip is thus moved in contact with the work and the tip soon has to be replaced.

The principal object of this invention is to provide a hand cutting-torch of the type referred to above with an element, separate from the tip itself, which will not only guide and steady the torch and maintain the tip the proper distance from the work, but will also produce the above mentioned beneficial drag.

Another object of the invention is to provide an improved attachment for standard hand cutting-torches which is simple and inexpensive and which has a drag element that will function to steady and guide the torch, maintain the tip the proper distance from the work, and also produce the beneficial drag.

According to the invention there is positioned just to the rear of the torch tip a wear-resistant drag element adapted to ride in the upper portion of the kerf cut by the torch. In the preferred form of the invention the drag element forms a part of an attachment which may be clamped to the tip of a standard cutting-torch or to a part of the torch body in which the tip is mounted.

The preferred form of the invention is illustrated in the accompanying drawing, in which—

Fig. 1 is a side view partly in broken section of the tip end of a standard cutting-torch showing the improved drag attachment mounted thereon;

Fig. 2 is a broken view of the torch assembly shown in Fig. 1, looking from the left;

Fig. 3 is a plan view of the drag attachment removed from the torch; and

Fig. 4 is a broken side view of the attachment shown in Fig. 3, with the drag rod or element separated from its holder.

Referring to the drawings, Fig. 1 shows a standard hand cutting-torch 10 provided with the usual angle head 12 in which a tapered tip 14 is clamped by means of the tip nut 16. The tip 14 has the usual passages 18 for delivering a combustible gas mixture to the preheating flames, and a central passage 20 for the cutting-oxygen. The torch is shown cutting a kerf 22 in a metal work-piece 24.

The improved drag attachment of the present invention comprises a split clamping ring or collar 26, which in the present instance is shown in Figs. 1 and 2 as being clamped around the lower portion of the head 12, by means of a clamping bolt 28. A downwardly projecting metal leg 30 is attached to the side of the collar 26 and extends substantially parallel to the axis of the tip 14. The leg 30 may be of round metal rod stock which may be welded in a concave groove formed in the outer surface of the collar 26, as indicated in Fig. 3. This provides a rigid construction for mounting the remaining elements of the drag attachment. A holder 32, preferably having approximately the shape and form indicated, is fixed to the lower end of the leg 30. The holder 32 is preferably drilled with a vertical hole to fit the leg 30 which may be welded in place as indicated in Fig. 1. The holder 32 is also drilled with a hole 34 as indicated in Fig. 4, for receiving a drag rod or element 36. The hole 34 is preferably inclined at about the same angle as the taper of the tip 14 so that the drag rod may be mounted as near to the tip as practicable. The holder 32 is provided with a set screw 38 for holding the drag element 36 in the desired adjusted position.

The attachment is so positioned on the torch that the drag element 36 is located just to the rear of the torch tip. The drag element projects downwardly below the torch tip far enough to permit its lower end to ride in the upper portion of the kerf cut by the torch and in so doing support the end of the torch tip the proper distance from the workpiece, as hereinafter described.

The body of the drag element is greater in cross-section than the width of the kerf cut by the torch and its lower end is wedge-shaped as best shown in Fig. 2. Thus, the wedge rides on the upper edges of the kerf. The distance the wedge projects down into the kerf depends upon the width of the kerf, but the wedge is wide enough at its widest part to prevent the body of the drag element from ever dropping down into the kerf. If the wedge does not ride the proper distance down in the kerf to support the torch tip the desired distance from the work-piece then the drag element is adjusted vertically in its holder until the spacing between the torch tip and the work-piece is the right amount.

The planes of the bevels that form the wedge at the lower end of the drag element preferably converge toward the leading side of the drag element to form a front edge that may be rounded off or beveled, as shown at 40, so that it slopes downwardly and rearwardly. Thus, the lower end of the drag element is shaped somewhat like the bow of a ship and this facilitates the movement of the drag element along the kerf.

The drag element 36 is preferably made of some wear-resistant metal, such, for example, as cold rolled steel, or steel containing chromium or sillicon.

It will now be seen that the attachment is of simple construction and may be readily applied to a standard hand cutting-torch, and when so applied the lower end of the drag element will ride in the kerf cut by the torch and will not only guide and steady the torch and maintain the torch tip the proper distance from the work-piece, but it will also tend to somewhat resist the forward movement of the torch and thus produce a drag which gives the operator the proper feel of the torch and assists him in moving it at the proper uniform cutting speed.

Instead of mounting the drag element on an attachment of the type above described it may be permanently attached to the torch if so desired. For instance, the leg 30 may be welded or otherwise permanently secured to the rear edge of the head 12. In any event the drag device constitutes a separate element from the torch tip which may therefore be of the standard unaltered type.

If the torch is used for some operation where the drag element may be in the way or is not necessary, it may be easily removed from its holder, or if the drag element forms a part of an attachment, the entire attachment may be readily removed from the torch.

I claim:

1. In combination with a hand-guided, kerf-cutting torch which when held at a predetermined distance from a work-piece and moved in a straight line will cut a kerf of substantially uniform predetermined width, a drag element, means for mounting the drag element on the torch so that the lower end thereof is closely adjacent the discharge end of the torch tip and projects therebeyond, the lower end of the drag element having a tapering portion diverging from a width at its distal end less than the width of the kerf cut by the torch to a width greater than the width of such kerf, said tapering portion of the drag element being adapted to project into the kerf and to ride on the edges thereof to produce a drag on the torch and to assist in spacing the torch said predetermined distance from a work-piece during the cutting operation.

2. The combination of a hand cutting torch and drag element as recited in claim 1 in which the drag element is adjustable relative to the torch tip substantially in the longitudinal direction of the torch tip.

3. The combination of a hand cutting torch and drag element as recited in claim 1 in which the tapered portion of the drag element includes a wedge-shaped portion having planar sides which converge toward their leading edges and their leading edges are beveled rearwardly toward the distal end of the tapered portion.

ROBERT M. ROOKE.

REFERENCES CITED

The following references are of record in the file of this patent:

UNITED STATES PATENTS

| Number | Name | Date |
|---|---|---|
| 1,622,115 | Johnson | Mar. 13, 1928 |
| 2,224,242 | Young | Dec. 10, 1940 |
| 2,238,578 | Burkeman | Apr. 15, 1941 |
| 2,296,480 | Nicolai | Sept. 22, 1942 |
| 2,341,358 | Brow et al. | Feb. 8, 1944 |
| 2,377,673 | Chaddock | June 5, 1945 |
| 2,424,286 | Robbins | July 22, 1947 |

FOREIGN PATENTS

| Number | Country | Date |
|---|---|---|
| 43,161 | Switzerland | Apr. 7, 1908 |
| 539,216 | Germany | Nov. 26, 1931 |